US012670602B2

(12) United States Patent
Zhang et al.

(10) Patent No.: US 12,670,602 B2
(45) Date of Patent: Jun. 30, 2026

(54) TRACKING OBJECTS WITH OBSCURED OBJECT DETERMINATION BASED ON PROXIMITY OF BOUNDING SHAPES AND RELATIVE MOTION OF OBJECTS, AND BOUNDING SHAPE ESTIMATION

(71) Applicant: Hewlett-Packard Development Company, L.P., Spring, TX (US)

(72) Inventors: Peter Siyuan Zhang, Spring, TX (US); Yun David Tang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 278 days.

(21) Appl. No.: 18/263,256

(22) PCT Filed: Feb. 25, 2021

(86) PCT No.: PCT/US2021/019676
§ 371 (c)(1),
(2) Date: Jul. 27, 2023

(87) PCT Pub. No.: WO2022/182350
PCT Pub. Date: Sep. 1, 2022

(65) Prior Publication Data
US 2024/0127458 A1       Apr. 18, 2024

(51) Int. Cl.
*G06T 7/20* (2017.01)
*G06T 5/20* (2006.01)
(Continued)

(52) U.S. Cl.
CPC .................. *G06T 7/20* (2013.01); *G06T 5/20* (2013.01); *G06T 7/246* (2017.01); *G06T 7/277* (2017.01); *G06T 7/62* (2017.01); *G06T 7/70* (2017.01); *G06T 7/73* (2017.01); *G06V 10/25* (2022.01); *G06V 10/62* (2022.01); *G06V 20/52* (2022.01);
(Continued)

(58) Field of Classification Search
CPC .. G06T 5/20; G06T 7/20; G06T 7/246; G06T 7/62; G06T 7/70; G06T 7/73; G06T 2207/30196; G06T 2210/12; G06V 10/25; G06V 10/62; G06V 20/52; G06V 40/20; G06V 2201/07
See application file for complete search history.

(56) References Cited

U.S. PATENT DOCUMENTS 8,891,818 B2    11/2014   Sharma
9,177,229 B2    11/2015   Merler et al.
(Continued)

OTHER PUBLICATIONS

Iter, Dan, et al. "Target Tracking with Kalman Filtering, KNN and LSTMs." CS229: Machine Learning, Stanford University (Year: 2016).*
(Continued)

*Primary Examiner* — Scott A Rogers
(74) *Attorney, Agent, or Firm* — Quarles & Brady LLP

(57) ABSTRACT

Examples of electronic devices are described herein. In some examples, an electronic device includes a processor to provide a first set of images to an object tracker to output a bounding shape that represents an object in the first set of images. In some examples, the processor is to estimate a size and location of the bounding shape in a second set of images in response to the object tracker losing track of the object in the second set of images.

15 Claims, 8 Drawing Sheets

(51) Int. Cl.

| | |
|---|---|
| *G06T 7/246* | (2017.01) |
| *G06T 7/277* | (2017.01) |
| *G06T 7/62* | (2017.01) |
| *G06T 7/70* | (2017.01) |
| *G06T 7/73* | (2017.01) |
| *G06V 10/25* | (2022.01) |
| *G06V 10/62* | (2022.01) |
| *G06V 20/52* | (2022.01) |
| *G06V 40/20* | (2022.01) |

(52) U.S. Cl.
CPC .... *G06V 40/20* (2022.01); *G06T 2207/30196* (2013.01); *G06V 2201/07* (2022.01)

(56) References Cited

U.S. PATENT DOCUMENTS

| | | | | |
|---|---|---|---|---|
| 9,665,804 | B2 | 5/2017 | Sarkis et al. | |
| 9,836,852 | B2 * | 12/2017 | Li | H04N 23/63 |
| 10,269,125 | B1 | 4/2019 | Kim et al. | |
| 10,909,394 | B2 * | 2/2021 | Bovyrin | G06V 10/50 |
| 11,284,168 | B2 * | 3/2022 | Zhang | G06V 20/46 |
| 11,321,851 | B2 * | 5/2022 | Siegemund | G06T 7/40 |
| 11,514,585 | B2 * | 11/2022 | Pokhrel | H04N 7/183 |
| 11,887,318 | B2 * | 1/2024 | Pokhrel | H04N 23/69 |
| 12,131,485 | B2 * | 10/2024 | Takahashi | H04N 23/698 |
| 12,417,637 | B2 * | 9/2025 | Sommer | G06V 10/774 |

| | | | | |
|---|---|---|---|---|
| 2015/0178568 | A1 * | 6/2015 | Shellshear | G06T 7/277 |
| | | | | 382/103 |
| 2016/0133022 | A1 * | 5/2016 | Sarkis | G06T 7/246 |
| | | | | 382/103 |
| 2017/0061229 | A1 * | 3/2017 | Rastgar | G06T 7/248 |
| 2017/0289445 | A1 | 10/2017 | Kumar et al. | |
| 2018/0084310 | A1 | 3/2018 | Katz et al. | |
| 2018/0286199 | A1 | 10/2018 | Chen et al. | |
| 2018/0307921 | A1 | 10/2018 | Vallespi-Gonzalez et al. | |
| 2019/0034734 | A1 | 1/2019 | Yen et al. | |
| 2024/0185435 | A1 * | 6/2024 | Stout | G06T 7/246 |
| 2024/0362922 | A1 * | 10/2024 | Yang | G06V 10/82 |
| 2024/0371178 | A1 * | 11/2024 | Hutchinson | G08G 1/096725 |
| 2024/0416829 | A1 * | 12/2024 | Faruque | B60Q 1/525 |
| 2025/0069238 | A1 * | 2/2025 | Li | G06V 10/82 |
| 2025/0371883 | A1 * | 12/2025 | Sohn | G06V 10/82 |

OTHER PUBLICATIONS

Tang et al. "Detection and tracking of occluded people." International Journal of Computer Vision, 110(1), pp. 58-69 (Year: 2014).*

Xu et al. "Non-linear target trajectory prediction for robust visual tracking." Applied Intelligence, 52(8), pp. 8588-8602 (Year: 2022).*

Hu, Weiming, et al. "A survey on visual surveillance of object motion and behaviors." IEEE Transactions on Systems, Man, and Cybernetics, Part C (Applications and Reviews) 34(3), pp. 334-352 (Year: 2004).*

* cited by examiner

Figure 4:
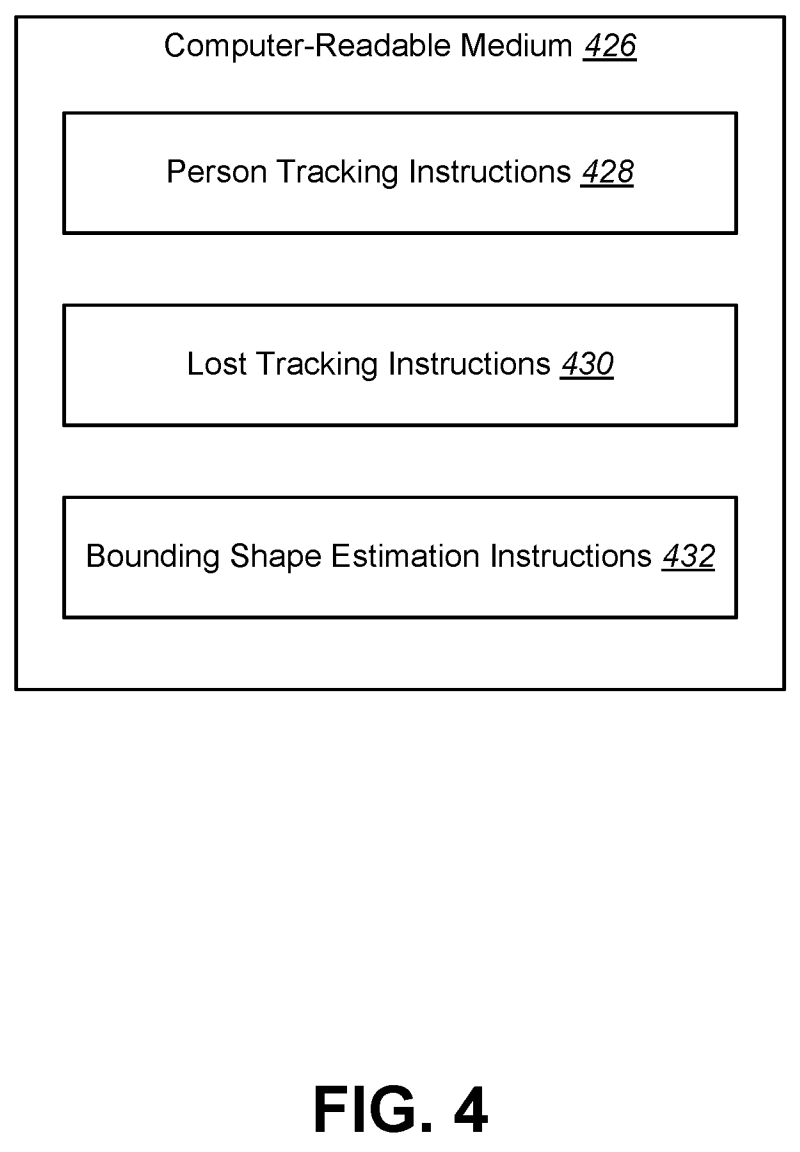

Computer-Readable Medium *426*

Person Tracking Instructions *428*

Lost Tracking Instructions *430*

Bounding Shape Estimation Instructions *432*

Figure 8:
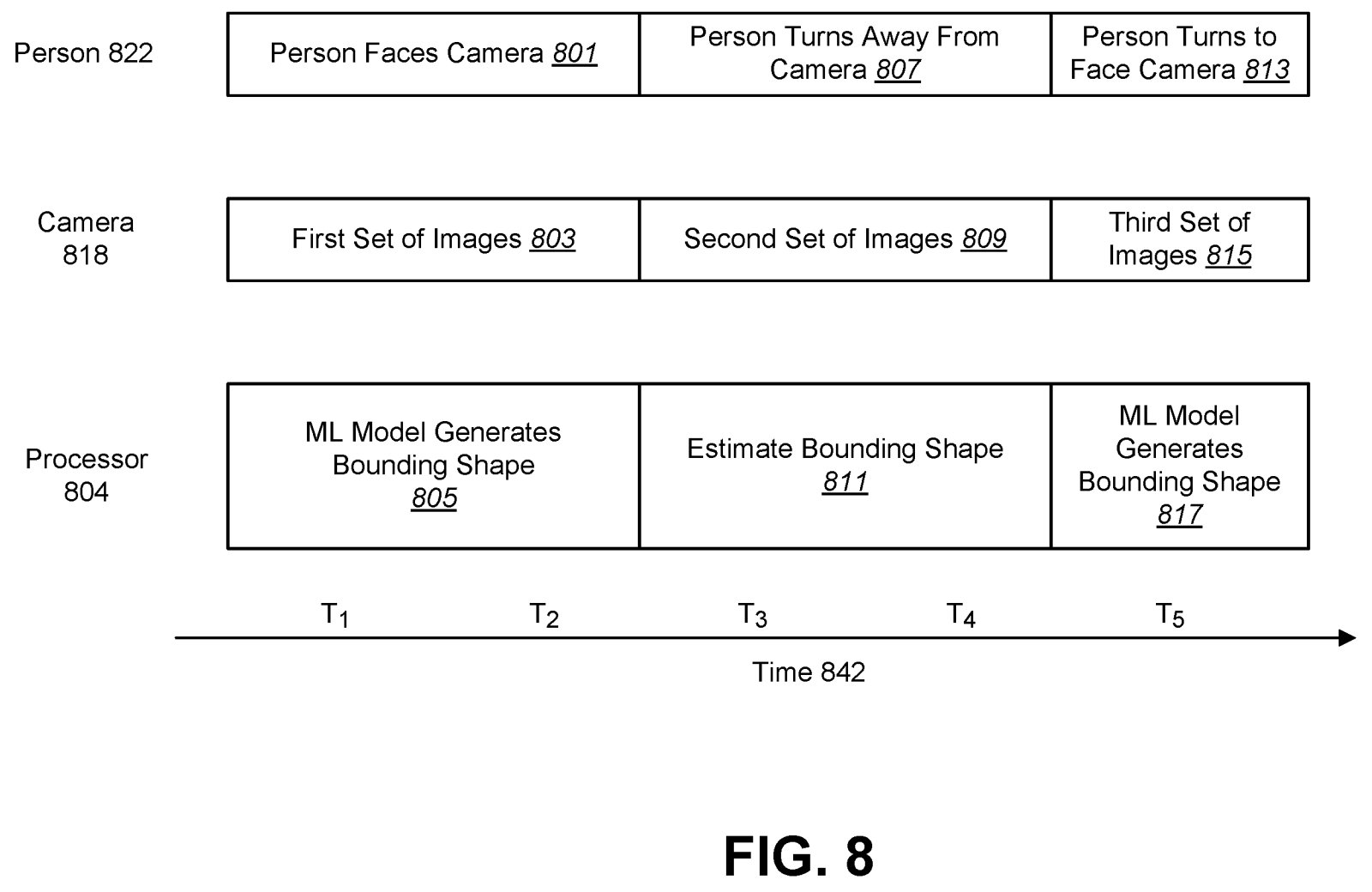

Person 822

Person Faces Camera *801*

Person Turns Away From Camera *807*

Person Turns to Face Camera *813*

Camera 818

First Set of Images *803*

Second Set of Images *809*

Third Set of Images *815*

Processor 804

ML Model Generates Bounding Shape *805*

Estimate Bounding Shape *811*

ML Model Generates Bounding Shape *817*

$T_1$    $T_2$    $T_3$    $T_4$    $T_5$

Time 842

TRACKING OBJECTS WITH OBSCURED OBJECT DETERMINATION BASED ON PROXIMITY OF BOUNDING SHAPES AND RELATIVE MOTION OF OBJECTS, AND BOUNDING SHAPE ESTIMATION

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

FIG. 4 is a block diagram illustrating an example of a computer-readable medium for bounding shape estimation;

FIG. 8 is a timing diagram illustrating a third example scenario of bounding shape estimation.

Figure 1:
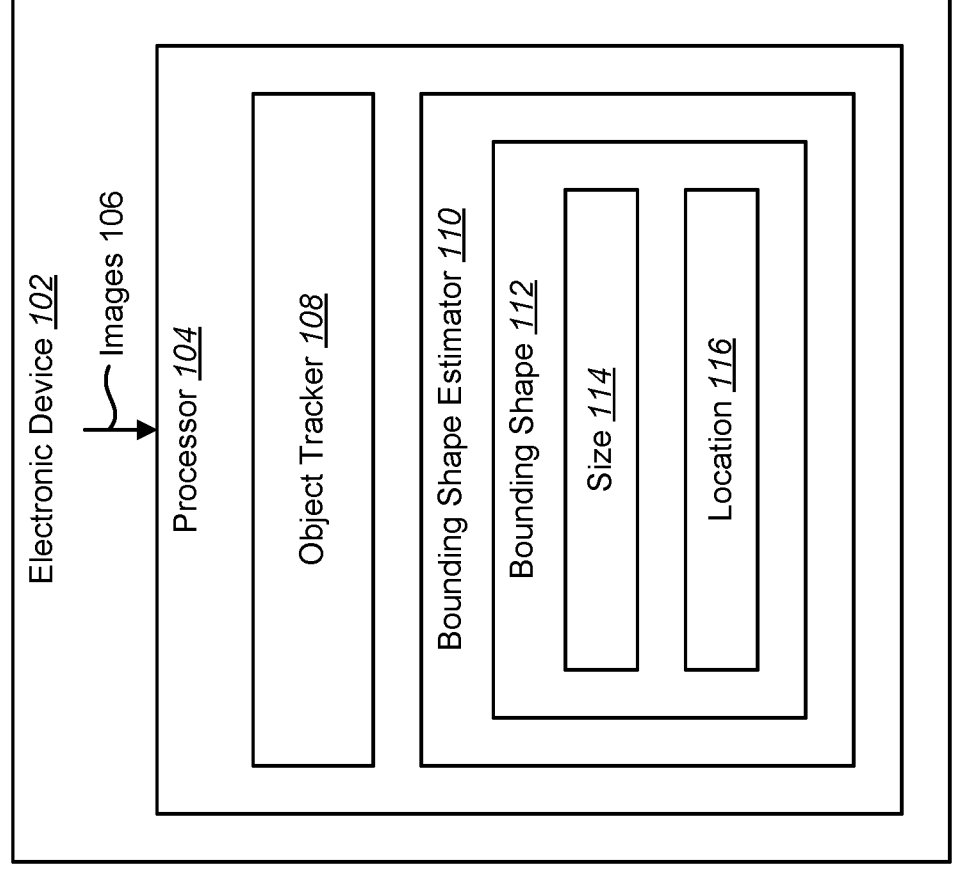
FIG. 1 is a block diagram illustrating an example of an electronic device to perform bounding shape estimation.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, wireless communication devices, game consoles, game controllers, smart appliances, printing devices, vehicles with electronic components, aircraft, drones, robots, smart appliances, etc.

In some examples, the electronic device may track objects in a set of images. As used herein, an image may include a digital image (also referred to as a frame). The images may be captured by a camera. In some examples, the camera may be included as a component of the electronic device. In other examples, the images may be captured by a camera that is separate from the electronic device. In this case, the images may be communicated to the electronic device in a file transfer.

In some examples, the tracked objects may be people within the field of view of the camera. In other examples, the tracked objects may include non-human objects (e.g., animals, automobiles, manufactured parts, robots, etc.).

In some examples, the electronic device may generate a bounding shape to represent a tracked object. For example, the electronic device may use computer-vision (CV) processes and/or machine-learning (ML) processes to detect an object from one image to another image. The CV processes and/or ML processes may generate a bounding shape around the tracked object. As used herein, the bounding shape may be a geometrical form used to represent the tracked object. In some examples, the bounding shape may be a two-dimensional (2D) shape. Some examples of a 2D bounding shape include a box (e.g., square or rectangular), capsule, circle, ellipse, etc.

The bounding shape may include characteristics. For example, the electronic device may determine a size (e.g., area, volume, number of pixels, etc.) of a bounding shape in an image. In other examples, the electronic device may determine the location (e.g., center, corner, edge) of the bounding shape in an image. In a 2D case, the location of the bounding shape may be represented as 2D coordinates (e.g., x,y coordinates) in an image.

Bounding shapes may be used to categorize objects and/or make decisions about objects. For example, the electronic device may use the bounding shape of a detected person in relation to the bounding shape of a main user of the electronic device to determine whether the detected person is a potential security threat (e.g., a shoulder surfer). In other examples, an autonomous vehicle may use the bounding shapes of multiple objects (e.g., vehicles, pedestrians, etc.) to make navigational decisions.

In some examples, the CV processes and/or ML processes used to track an object may lose track of the object. In some examples, a first object may become obscured by a second object. For instance, a first person may move behind a second person in series of images. In another example, the first person may remain stationary, but the second person may move in front of the first person. In another example, CV processes and/or ML processes that detect faces may fail to track a person that turns their face away from the camera. In yet another example, an object may be visible to the CV processes and/or ML processes in one orientation, but may be unobservable in another orientation.

In these cases, when the CV processes and/or ML processes lose track of an object, the CV processes and/or ML processes may stop outputting a bounding shape for that object. However, if the object remains within the setting of a camera, but becomes untracked (e.g., due to being obscured or due to orientation of the object), the lack of bounding shape may negatively impact processes that use bounding shapes to make decisions.

The examples described herein provide for bounding shape estimation. In some examples, CV or ML processes may be used to track an object in a first set of images. If the CV or ML processes lose track of the object, then the bounding shape may be estimated according to different examples, as described herein.

FIG. 1 is a block diagram illustrating an example of an electronic device 102 to perform bounding shape estimation. Examples of the electronic device 102 may include computing devices, laptop computers, desktop computers, tablet devices, cellular phones, smartphones, wireless communication devices, gaming consoles, gaming controllers, smart appliances, printing devices, automated teller machines (ATMs), vehicles (e.g., automobiles) with electronic components, autonomous vehicles, aircraft, drones, robots, smart appliances, etc.

In some examples, the electronic device 102 may include a processor 104. The processor 104 may be any of a microcontroller (e.g., embedded controller), a central processing unit (CPU), a semiconductor-based microprocessor, graphics processing unit (GPU), field-programmable gate array (FPGA), an application-specific integrated circuit (ASIC), a circuit, a chipset, and/or other hardware device suitable for retrieval and execution of instructions stored in a memory. The processor 104 may fetch, decode, and/or execute instructions stored in memory (not shown). While a single processor 104 is shown in FIG. 1, in other examples, the processor 104 may include multiple processors (e.g., a CPU and a GPU).

The memory (not shown) of the electronic device 102 may be any electronic, magnetic, optical, and/or other physical storage device that contains or stores electronic information (e.g., instructions and/or data). The memory may be, for example, Random Access Memory (RAM), Electrically Erasable Programmable Read-Only Memory (EEPROM), Dynamic Random Access Memory (DRAM), Synchronous DRAM (SDRAM), magnetoresistive random-access memory (MRAM), phase change RAM (PCRAM), nonvolatile random-access memory (NVRAM), memristor, flash memory, a storage device, and/or an optical disc, etc. In some examples, the memory may be a non-transitory tangible computer-readable storage medium, where the term "non-transitory" does not encompass transitory propagating signals. The processor 104 may be in electronic communication with the memory. In some examples, a processor 104 and/or memory of the electronic device 102 may be combined with or separate from a processor (e.g., CPU) and/or memory of a host device.

In some examples, the electronic device 102 may receive images 106. In some examples, the electronic device 102 may include a camera. In some examples, the camera may be integrated with the electronic device 102. For example, in the case of a laptop computer, a tablet computer, or a smartphone, the camera may be built into the electronic device 102. In other examples, the camera may be separate from the electronic device 102 but may communicate with the electronic device 102. For example, an external webcam may be connected to the electronic device 102. In an example, an external USB camera may be used when an external display device (e.g., monitor) is connected to the electronic device 102.

In yet other examples, the electronic device 102 may receive images 106 captured by a remote camera. For instance, images 106 captured by a camera may be stored in a first location and transmitted to the electronic device 102 (e.g., over a local network, the internet, etc.).

In some examples, the camera may be positioned to view the user (also referred to as the main user) of the electronic device 102. For example, the camera of a laptop computer may view the main user when the lid of the laptop computer is open. In this scenario, the camera may be located in a frame of the case housing the monitor of the laptop computer. In other examples, the camera may be a camera of a tablet computer or smartphone. In yet other examples, the camera may be a webcam or other external camera positioned to view the user of the electronic device 102. In yet other examples, the camera may be positioned to view a scene unrelated to (e.g., removed from) the physical location of the electronic device 102.

In some examples, the camera may capture video images and/or a sequence of still images. The images 106 captured by the camera may be two-dimensional images. For example, the images 106 may be defined by an x-coordinate and a y-coordinate.

The camera and/or electronic device 102 may include computer-vision (CV) and/or machine-learning (ML) capabilities to recognize objects (e.g., people) within images 106 captured by the camera. In some examples, the electronic device 102 may recognize that an object in an image is a person. However, in some examples, the electronic device 102 may not identify a specific person.

As described above, bounding shape estimation may be a concern for a user or organization. In some examples, the electronic device 102 may estimate a bounding shape for a set of images 106 captured by a camera. As used herein, a set of images may include one or a plurality of images. In some examples, the electronic device 102 may track a first person and/or a main user of the electronic device 102. Examples of different scenarios involving a first person and a second person are illustrated in FIGS. 2-3.

Figure 2:
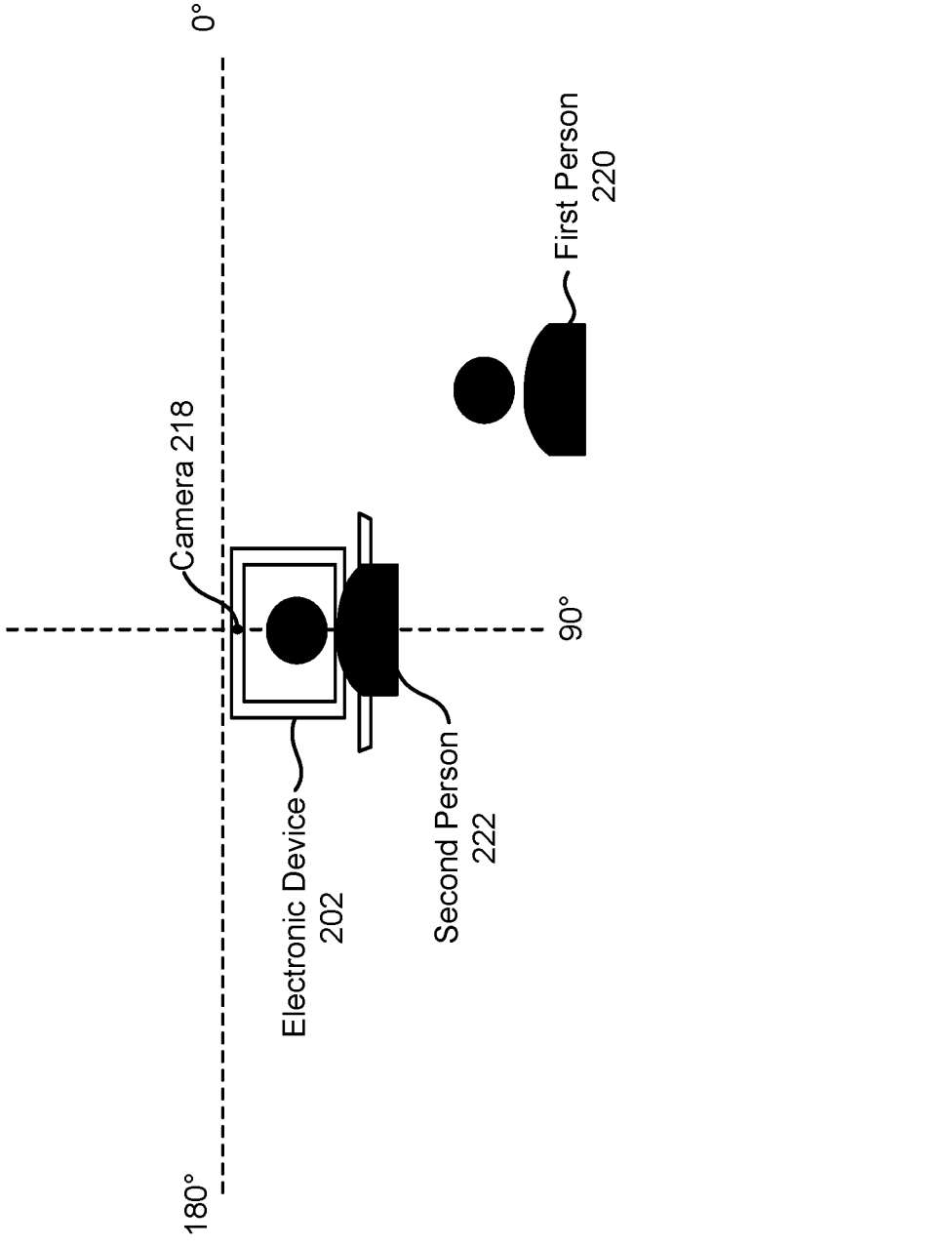
FIG. 2 is an example illustrating a first person, a second person and an electronic device.
Figure 3:
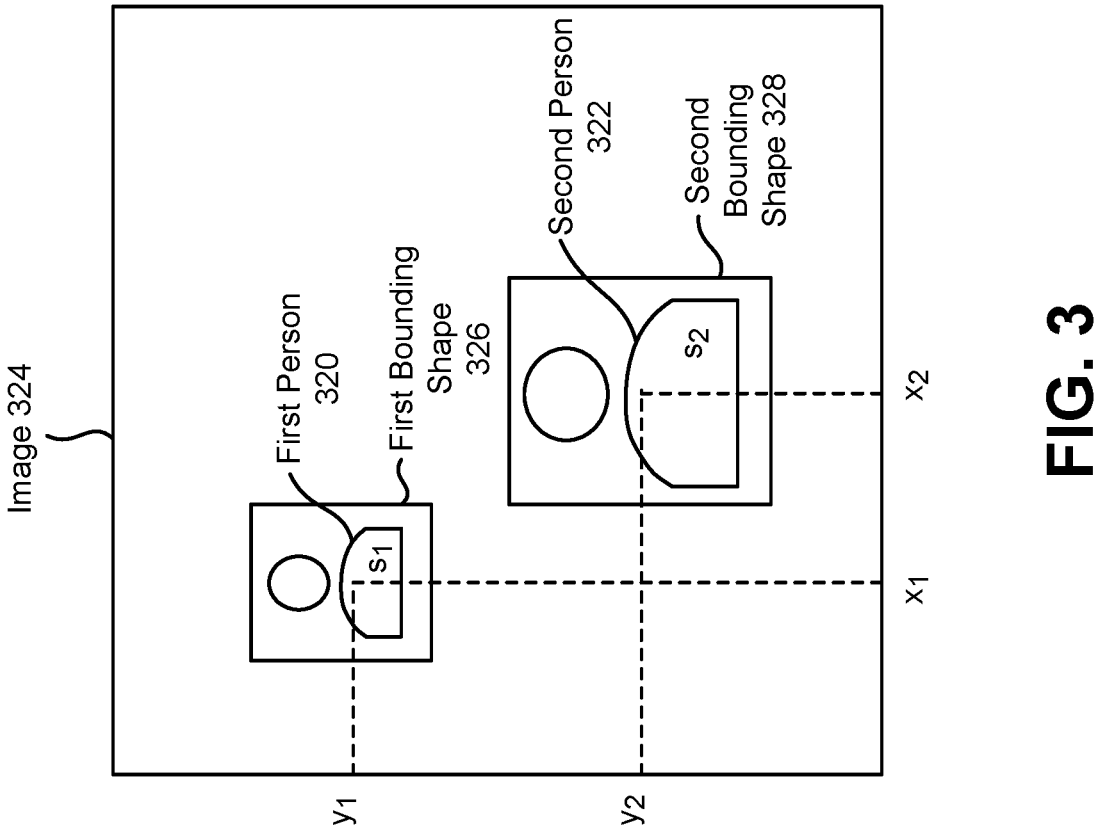
FIG. 3 illustrates an example of an image of a first person and a second person captured by a camera of an electronic device.

As seen in FIG. 2, a first person 220 and a second person 222 may be located in a scene observed by a camera 218. The second person 222 may be using an electronic device 202 with a camera 218. For example, the second person 222 may be the main user of the electronic device 202. In this example, the first person 220 is located behind the second person 222 in a manner that gives the first person 220 a view of the electronic device 202. For instance, the first person 220 may be positioned to view the display device and/or keyboard of the electronic device 202. In an example, the first person 220 may be positioned at an angle that is offset from a 90 degree (e.g., perpendicular) position in relation to the second person 222 and electronic device 202. For example, the first person 220 may be moving toward the second person 222 when viewed by the camera 218.

In this example, the first person 220 may be referred to as a shoulder surfer. In some examples, the first person 220 may attempt to read information displayed by the electronic device 202. This scenario may be referred to as shoulder surfing. In other examples, the first person 220 may direct a recording device at the electronic device 202 to capture images (e.g., still images and/or video images) of the electronic device 202 (e.g., display device and/or keyboard of the electronic device 202). Examples of a recording device include a webcam, a smartphone with a camera, a camcorder, augmented reality glasses, digital single-lens reflex camera (DSLR), etc.

It should be noted that the camera 218 may view the first person 220 positioned behind or to the side of the second person 222. The camera 218 may be used by the electronic device 202 to generate bounding shapes to represent the first person 220 and/or the second person 222 based on an observed scenario.

FIG. 3 illustrates an example of an image 324 of a first person 320 and a second person 322 captured by a camera of the electronic device. In some examples, the electronic device may detect the second person 322 as the main user of the electronic device. In this example, a main user of the electronic device may be located approximately in the center of the image 324 in a horizontal (e.g., x) direction and within a lower region of the image 324 in the vertical (e.g., y) direction.

In this example, the electronic device may determine a first bounding shape 326 (e.g., a bounding box) for the first person 320 and a second bounding shape 328 (e.g., a bounding box) for the second person 322. In this example, the first bounding shape 326 has a center location of $(x_1, y_1)$ and a size (e.g., bounding box size) of $s_1$. The second bounding shape 328 has a center location of $(x_2, y_2)$ and a size (e.g., bounding box size) of $s_2$.

In some examples, the electronic device may detect a person in the image 324 as a shoulder surfer. In this example, the electronic device may determine that the first person 320 is a shoulder surfer based on the size and position of the first person 320 with respect to the second person 322 (e.g., the main user). For example, the shoulder surfer may be located to the side of the main user.

The electronic device may determine that the shoulder surfer is behind the main user based on the size (e.g., bounding box size) of and vertical position (e.g., y-coordinate) of the shoulder surfer with respect to the main user. For example, if the size (e.g., the bounding box size) of the shoulder surfer is less than a threshold amount the size of the main user and/or the difference between the vertical positions of the shoulder surfer and the main user is greater than a threshold amount, then the electronic device may designate the second person as a shoulder surfer.

Referring again to FIG. 1, the electronic device 102 may include circuitry and/or instructions to estimate a bounding shape 112 for an object. In some examples, the processor 104 may generate the bounding shape 112 based on images 106 captured by a camera. In some examples, the processor 104 may be embedded in the camera. For example, the processor 104 may reside in an image signal processor (ISP) chip of the camera. In other examples, the processor 104 may be included in a vision chip that is separate from (e.g., external to) the camera. In yet other examples, the processor 104 may run on a host of the electronic device 102 with a GPU.

The processor 104 may implement an object tracker 108 to track objects (e.g., people, vehicles, electronic devices, etc.) in images 106 provided by a camera. In some examples, the object tracker 108 may include instructions executed by the processor 104. In some examples, the object tracker 108 may include a CV process and/or a ML model to detect and track an object in images 106.

In some examples (referred to as Approach A), a computer-vision process may include video and/or image processing for providing images as input for the ML model for person detection. In these examples, the video/image processing may include noise reduction with a filter (e.g., Gaussian filter or Median filter). The computer-vision process may also include image brightness and contrast enhancement with histogram analysis and a gamma function. In some examples, the brightness and contrast enhancement may use a region-based approach where the central (e.g., 50%) region of the image is used for analysis. The processed image may be down sampled and then input to a ML model (e.g., a deep learning model, convolutional neural networks (CNNs) (e.g., basic CNN, R-CNN, inception model, residual neural network, etc.) and detectors that are built on convolutional neural network (e.g., Single Shot MultiBox Detector (SDD), You Only Look Once (YOLO), etc.) to detect and classify a person.

In some other examples (referred to as Approach B), a computer-vision process may include a face detector to locate a human accurately. In this case, the computer-vision process may be a non-ML approach. The face detector may share the image pre-processing of Approach A. Furthermore, Approach B may use different techniques to detect faces. In an example, the face detector may use appearance-based approaches (e.g., Eigenface approach). In another example, the face detector may use feature-based approaches (e.g., training a cascade classifier through extracted facial features). In yet another example, the face detector may use a template-based approach that uses defined or parameterized face templates to locate and detect the faces through the correlation between the templates and input images.

In yet other examples (referred to as Approach C), a computer-vision process may use multi-level processing for detecting a person. Low-level vision processing may include image processing for noise reduction, and image contrast and brightness enhancement as in Approach A. In some examples, a high-pass filter may be used for image sharpening if a blurry image or blurry region exists.

In Approach C, with image enhancement, a median level processing may include image segmentation to extract the foreground region from the background through image thresholding, or through background subtraction using an average background image. Feature extraction may then include detecting features (e.g., edges using Canny Edge detector), finding blobs and contours (e.g., through Connected Component Analysis), and/or determining corner points with a corner detector (e.g., with Eigen analysis). Object labelling may then be performed to label individual blobs, contours, or connected edges as an object region. Regions may be filtered or merged based on criteria (e.g., size, shape, location, etc.).

In further examples of Approach C, the high-level processing for human or object detection may be based on the labelled object from the median-level vision process. For example, the size, location and shape of the merged object may be calculated to determine if a human or other object is detected.

In other examples, the high-level processing may include a pattern matching approach. In this case, instead of extracting features and labeling object as described above, known object template(s) (e.g., human templates) may be stored in the memory of the electronic device 102. A probabilistic search and score may be determined by comparing regions in an image with the object templates. An object (e.g., a human) may be detected if the score is greater than a threshold value.

In some examples, the object tracker 108 may include a ML model to detect an object (e.g., the main user, a second person, a vehicle, etc.) in images 106 provided by the camera. In some examples, the ML model may be a trained model that runs on a neural network. Different depths (e.g., layers) of a neural network or neural networks may be utilized in accordance with some examples of the techniques described herein.

In some examples, the ML model may be trained to detect and classify an object. For example, the ML model may be trained to detect and classify a first person in images 106. In some examples, the ML model may classify the first person as a collaborator with the main user of the electronic device 102 or a shoulder surfer based on the size and location of the second person with respect to the main user. In some examples, the ML model may be trained to detect and classify a second person as the main user based on a size and location of the second person within the field of view of the camera.

In some examples, the ML model may be trained using training data that includes images of a first person in various locations behind a main user. The ML model may also be trained using images of a first person as a collaborator in various locations beside a main user. The training images may show the first person and the second person with different eye gazes and/or head orientations.

In some examples, the training data may be categorized according to a class of person. In some examples, the training data may include multiple different classes of person detection (e.g., main user, shoulder surfer, collaborator, etc.).

In some examples, the object tracker 108 may distinguish between people (e.g., a first person and a second person) in images 106. For example, the object tracker 108 may use a computer-vision module and/or a ML model to distinguish between a first person and a second person. In some examples, the object tracker 108 may determine that a person is a main user of the electronic device 102. This may be accomplished as described in the examples of FIG. 3. For example, the object tracker 108 may detect that a person is present in image 106. The object tracker 108 may then determine that the person is the main user based on the size and location of the person in the images 106.

In some examples, the processor 104 may provide a first set of images 106 to the object tracker 108 to output a bounding shape that represents an object in the first set of images 106. For example, the bounding shape output generated by the object tracker 108 may include size information and/or location information for the bounding shape. The size information may include a size (e.g., number of pixels, or area) for a bounding shape of a tracked object. In the case of a tracked person, the size information may indicate the size of the bounding shape for the tracked person. The location information may include coordinates to position the bounding shape in the first set of images 106. The location information may reference a center, corner, edge, side, etc. of a bounding shape. It should be noted that a bounding shape may be generated for each image in the first set of images 106.

In some examples, a main user may have a large size and may be located approximately at the center of the images 106. In the first set of images 106, a person behind the main user, may enter the field of view of the camera. The person may be smaller in size and the starting location of the person may be off center. The object tracker 108 may detect and follow the person as they move within the field of view of the camera. For example, a person may move from one side to another side of the camera field of view.

While the object tracker 108 detects an object, the object tracker 108 may generate a bounding shape to represent the object in the first set of images 106. However, at some point, the object tracker 108 may lose track of the object. In some examples, a first object (e.g., a person moving in the image background) may be obscured by a second object (e.g., a main user located in the image foreground). In the case of two people, the object tracker 108 may start outputting bounding shapes for the first person and the second person. However, during a transition when the second person obscures the first person, the first person may disappear from view, or the first person may be inaccurately labelled and/or determined as the extended part of the second person. In this case, the object tracker 108 may lose track of the first person.

This may be due to the inability of the input images to show two overlapping objects. In other examples, the object tracker 108 (e.g., a ML model, neural network, etc.) may not be able to distinguish between two objects that are in close proximity. Object or human detection may include Non-maximum Suppression (NMS) as the post-processing for obtaining the correct bounding shape location and size on the tracked object. However, when the two objects are very close, the NMS may pick a single object based on the process of iterative intersection over union filtering on multiple potential candidates. The object tracker 108 may discard a bounding shape for a smaller and overlapped object (e.g., the obscured first object). The first human or object may even be determined by the processor 104 as part of the second human or object when most of the first human/object is obscured by the second human/object.

In other examples, an object (e.g., the first person) may be in the frame but moves in another direction. For instance, a person may turn their face away from the camera or may turn to the side, thus presenting less information for the object tracker 108 to detect the person in the images 106. In this case, the object tracker 108 may not have enough confidence to make a determination about the presence (e.g., location and/or size) of an object.

In some examples, the processor 104 may implement a bounding shape estimator 110 to estimate a size 114 and location 116 of the bounding shape 112 in a second set of images 106 in response to the object tracker 108 losing track of the object in the second set of images 106. The second set of images 106 may include a number of images captured by a camera after the first set of images.

In some examples, the bounding shape estimator 110 may estimate (e.g., impute) information for a missing (e.g., non-tracked) object based on information generated by the object tracker 108 in the first set of images 106. For example, the object tracker 108 may determine size information and location information for a bounding shape of an object in the first set of images 106. Using this bounding shape size information and location information, the bounding shape estimator 110 may estimate a bounding shape 112 for the object in the second set of images 106.

In some examples, the bounding shape estimator 110 may determine that the object is static in the first set of images 106. The bounding shape estimator 110 may then use location information for the bounding shape output by the object tracker 108 in the first set of images 106 to determine the location 116 of the bounding shape 112 in the second set of images 106. In some examples, the bounding shape estimator 110 may estimate the location 116 of the bounding shape 112 in the second set of images 106 using a minimum location, a maximum location, or an average location of the bounding shape in the first set of images 106.

In an example of using the minimum location of the bounding shape, the bounding shape estimator 110 may take the minimum value (e.g., minimum x-coordinate and minimum y-coordinate) for the bounding shape determined by the object tracker 108 in the first set of images 106. In an example of using the maximum location of the bounding shape, the bounding shape estimator 110 may take the maximum value (e.g., maximum x-coordinate and maximum y-coordinate) for the bounding shape determined by the object tracker 108 in the first set of images 106. In an example of using the average location of the bounding shape, the bounding shape estimator 110 may determine the average value of the location coordinates (e.g., x-coordinate and y-coordinate) for the bounding shape determined by the object tracker 108 in the first set of images 106.

In some examples, the bounding shape estimator 110 may determine that the object is moving in the first set of images 106. The bounding shape estimator 110 may then apply a filter to predict the location 116 of the bounding shape 112 in the second set of images 106 based on location information for the bounding shape output by the object tracker 108 in the first set of images 106. In some examples, the filter may include a Kalman filter, a Particle filter, or other process (e.g., Bene filter) to predict the location of an object based on the observed motion in the first set of images 106. For example, the bounding shape estimator 110 may use a Kalman filter for a linear dynamic estimate, to predict and generate the state (e.g., location) of an object at time k and beyond given the measurement of the object's locations from time 1 to k−1. In this case, the first set of images may include images 106 captured at time 1 to k−1. The second set of images may include images 106 captured from time k and onward. After the loss of tracking is resolved when the first person/object is visible and can be determined by the object tracker, the Kalman filter may update the new state (e.g., at time k+1) with measurement (also known as observation) from the object tracker 108. The updated Kalman filter may be used for further prediction when the loss of tracking occurs again. The Kalman filter may lose the prediction of the next state when at the time of k+i if a third person/object interferes with the second person/object spatially before the direct measurement from the object tracker 108 on the second person/object.

In some examples, the bounding shape estimator 110 may estimate the size 114 of the bounding shape 112 for the second set of images 106 based on the size information output by the object tracker 108 in the first set of images 106. In some examples, the bounding shape estimator 110 may estimate the size 114 of the bounding shape 112 in the second set of images 106 using a minimum size, a maximum size, or an average size of the bounding shape in the first set of images 106.

In yet other examples, the bounding shape estimator 110 may apply a filter (e.g., a Kalman filter) to predict both the size 114 and location 116 of the bounding shape 112 in the second set of images 106 based on size information and location information for the bounding shape output by the object tracker 108 in the first set of images 106. For example, the bounding shape estimator 110 may use information about the bounding shape of an object in the first set of images to estimate both location 116 and size 114 of the bounding shape 112 by using a Kalman filter. In an example, the bounding shape estimator 110 may use a Kalman filter on certain points (e.g., center, corners, etc.) of the bounding shape in the first set of images 106 to the estimate the state (e.g., location) of the points in the second set of images 106. Using the estimated location of the points, the bounding shape estimator 110 may determine the estimated size 114 and location 116 of the bounding shape 112.

In an example of tracking two people, a first person and a second person may be present in the camera field of view. The second person may be a main user located approximately in the center of the images 106 captured by the camera. The processor 104 (e.g., the object tracker 108) may generate a first bounding shape that represents the first person and a second bounding shape that represents the second person in a first set of images 106. At some point, the processor 104 (e.g., the object tracker 108) may lose track of the first person in a second set of images 106. For example, the first person may move behind the second person or the first person may turn away from the camera.

In this example, the processor 104 (e.g., the bounding shape estimator 110) may estimate a size 114 and location 116 of the first bounding shape 112 in the second set of images 106 in response to losing track of the first person in the second set of images 106. In some examples, the processor 104 (e.g., bounding shape estimator 110) may estimate the size 114 and location 116 of the first bounding shape 112 in response to determining that the first person is obscured by the second person. For example, the processor 104 may determine that the first person was in motion relative to the second person in the first set of images 106. The processor 104 may also determine that the bounding shape of the first person was in close proximity to the bounding shape of the second person. Based on the observed motion and proximity of the first person and second person, the processor 104 may determine that the second person is obscuring the first person in the second set of images 106. The processor 104 (e.g., the bounding shape estimator 110) may then estimate the bounding shape 112 for the second set of images 106.

The bounding shape estimator 110 may suspend (e.g., stop) estimation of the bounding shape 112 based on conditions. In one example, the bounding shape estimator 110 may suspend bounding shape estimation in response to the object tracker 108 tracking the object in a third set of images 106. For example, the object tracker 108 may resume tracking the object as it moves into view from behind a second obscuring object. In this case, the object tracker 108 may start generating the bounding shape to represent the object in the third set of images 106.

In another example, the bounding shape estimator 110 may suspend bounding shape estimation in response to determining that an estimated location of the object is outside the location of a second object. For example, a first object may be in motion when the object tracker 108 loses track of the first object behind a second object. In this case, if the bounding shape estimator 110 estimates that the location of the first object is outside the second object, then the first object should be visible by the object tracker 108. However, if the first object is not visible in a set of images 106, then this implies that the estimated location for the bounding shape 112 may not be reliable. For example, the first object may stop moving behind the second object. In another example, the direction of the first object's movement may change while it is untracked by the object tracker 108. In these cases, the bounding shape estimator 110 may suspend bounding shape estimation.

In another example, the bounding shape estimator 110 may suspend bounding shape estimation in response to expiration of a timeout period. For example, the electronic device 102 may include a timeout period for estimating the bounding shape 112. In some examples, the timeout period may be a period (e.g., time period, a number of captured images 106, etc.) beyond which the estimated bounding shape 112 may no longer be considered reliable. When the bounding shape estimator 110 begins estimating the bounding shape 112, the processor 104 may start the timeout period. Upon expiration of the timeout period, the bounding shape estimator 110 may suspend bounding shape estimation.

FIG. 4 is a block diagram illustrating an example of a computer-readable medium 426 for bounding shape estimation. The computer-readable medium 426 may be a non-transitory, tangible computer-readable medium 426. The computer-readable medium 426 may be, for example, RAM, EEPROM, a storage device, an optical disc, and the like. In some examples, the computer-readable medium 426 may be volatile and/or non-volatile memory, such as DRAM, EEPROM, MRAM, PCRAM, memristor, flash memory, and the like. In some examples, the computer-readable medium 426 described in FIG. 4 may be an example of memory for an electronic device described herein. In some examples, code (e.g., data and/or executable code or instructions) of the computer-readable medium 426 may be transferred and/or loaded to memory or memories of the electronic device. It should be noted that the term "non-transitory" does not encompass transitory propagating signals.

The computer-readable medium 426 may include code (e.g., data and/or executable code or instructions). For example, the computer-readable medium 426 may include person tracking instructions 428, lost tracking instructions 430, and bounding shape estimation instructions 432.

In some examples, the person tracking instructions 428 may be instructions that when executed cause the processor of the electronic device to provide a first set of images to a ML model to output a bounding shape that represents a first person in the first set of images. In some examples, the ML model may be trained to detect and classify the first person based on a size and location of the first person within the field of view of the camera. The ML model may detect and classify a second person as a main user based on a size and a location of the second person. The ML model may output a bounding shape (e.g., bounding box) to represent the first person. In some examples, this may be accomplished as described in FIG. 1.

In some examples, the lost tracking instructions 430 may be instructions that when executed cause the processor of the electronic device to determine that ML model loses track of the first person in a second set of images. For example, if the first person is obscured by the second person, or the first person turns away from the camera, then the ML model may stop generating a bounding shape for the first person. In some examples, this may be accomplished as described in FIG. 1.

In some examples, the bounding shape estimation instructions 432 may be instructions that when executed cause the processor of the electronic device to activate a filter to estimate the size and location of the bounding shape in the second set of images. For example, the processor may determine that the first person was in motion in the first set of images. The processor may activate the filter to estimate the size and location of the bounding shape in the second set of images in response to determining that the first person was in motion in the first set of images. In some examples, the filter may include a Kalman filter. In some examples, this may be accomplished as described in FIG. 1.

In some examples, the processor may also determine that the first person is within a threshold distance (e.g., a number of pixels) from a second person (e.g., the main user) when the ML model lost track of the first person. In this example, the processor may activate the filter to estimate the size and location of the bounding shape in response to determining that the first person is within the threshold distance from the second person.

In some examples, the instructions when executed may cause the processor to suspend the bounding shape estimation in response to the ML model resuming tracking of the first person. For example, if the ML detects the first person in a third set of images, the ML model may resume outputting the bounding shape for the first person. In this case, the processor may stop the bounding shape estimation. In other examples, the instructions when executed may cause the processor to suspend the bounding shape estimation in response to a timeout period for the bounding shape estimation.

Figure 5:
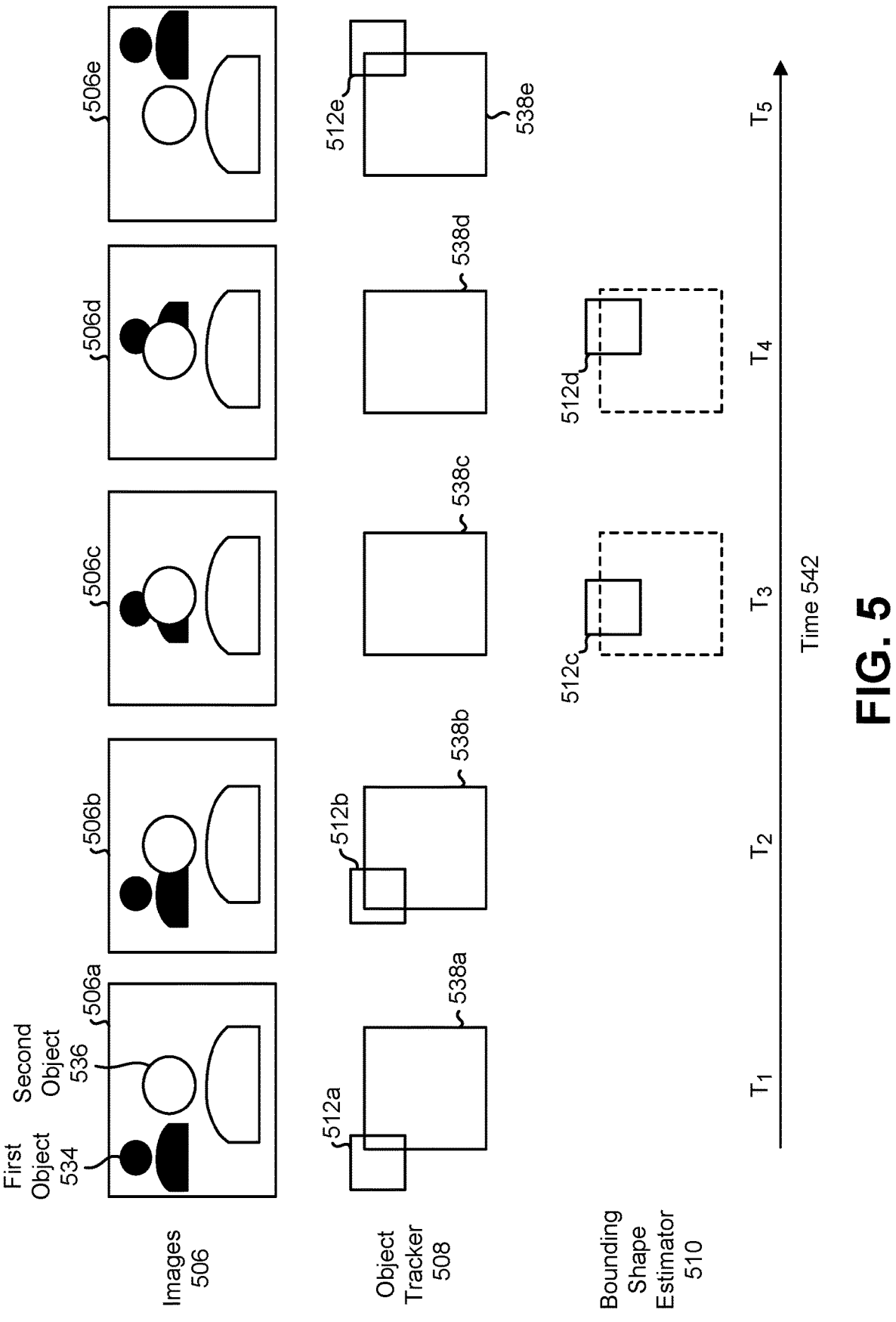
FIG. 5 illustrates an example scenario for bounding shape estimation.

FIG. 5 illustrates an example scenario for bounding shape estimation. In this example, a camera may capture images 506 that include a first object 534 (e.g., a first person) and a second object 536 (e.g., a second person). In this case, the first object 534 is located behind the second object 536. Also, the first object 534 moves from left to right with respect to the second object 536 across the images 506 over a period of time 542.

An object tracker 508 (e.g., CV process and/or ML model) may track the first object 534 and the second object 536 in the images 506. The object tracker 508 may output a first bounding shape to represent the first object 534. The object tracker 508 may output a second bounding shape to represent the second object 536.

In a first set of images 506*a-b*, the object tracker 508 tracks both the first object 534 and the second object 536. For example, at time $T_1$, the object tracker 508 generates a first bounding shape 512*a* to represent the first object 534 and a second bounding shape 538*a* to represent the second object 536 in image 506*a*. At time $T_2$, the object tracker 508 generates a first bounding shape 512*b* to represent the first object 534 and a second bounding shape 538*b* to represent the second object 536 in image 506*b*.

In a second set of images 506*c-d*, the object tracker 508 loses track of the first object 534. In this example, the first object 534 is partially obscured by the second object 536 such that the object tracker 508 may be unable to detect the first object 534. Therefore, at time $T_3$, the object tracker 508 generates a second bounding shape 538*c* to represent the second object 536 in image 506*c*. At time $T_4$, the object tracker 508 generates a second bounding shape 538*d* to represent the second object 536 in image 506*d*. However, the object tracker 508 stops outputting information for the first object 534 in the second set of images 506*c-d*.

A bounding shape estimator 510 may estimate a size and location of the first bounding shape in the second set of images 506*c-d* in response to the object tracker 508 losing track of the first object 534. The estimation may be accomplished as described in FIG. 1. At time $T_3$, the bounding shape estimator 510 estimates the first bounding shape 512*c* to represent the first object 534 in image 506*c*. At time $T_4$, the bounding shape estimator 510 estimates the first bounding shape 512*d* to represent the first object 534 in image 506*d*. It should be noted that in this example, the second bounding shape (represented by dashed lines) of the second object 536 is shown in relation to the estimated bounding box output by the bounding shape estimator 510 to show the context of the estimated bounding shape for time $T_3$ and $T_4$. However, in this example, the bounding shape estimator 510 does not generate the second bounding shape.

At time $T_5$, the object tracker 508 begins tracking the first object 534 again. Therefore, the object tracker 508 generates the first bounding shape 512*e* and the second bounding shape 538*e* in image 506*e*. At time $T_5$, the bounding shape estimator 510 suspends bounding shape estimation.

Figure 6:
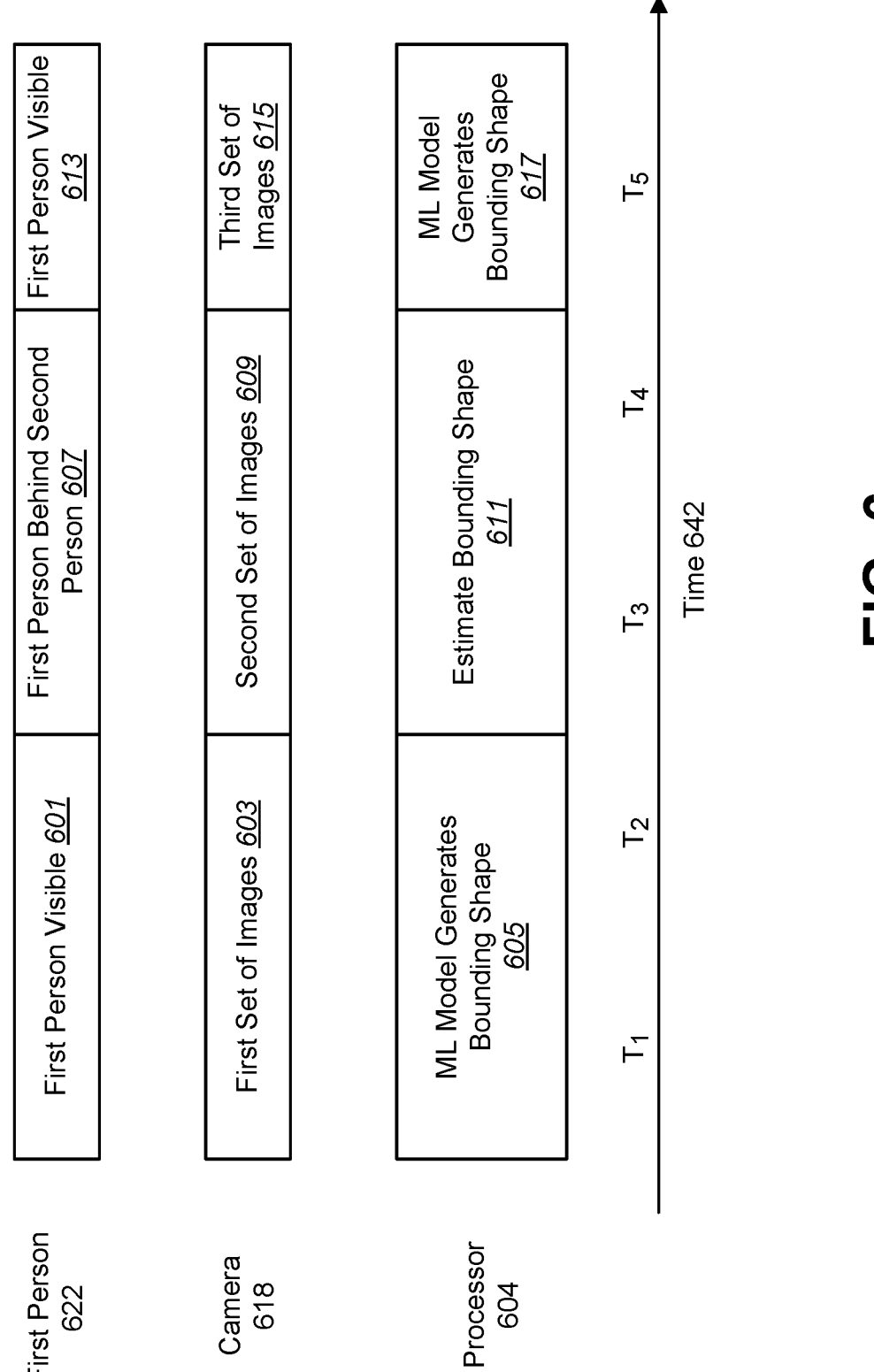
FIG. 6 is a timing diagram illustrating a first example scenario of bounding shape estimation.

FIG. 6 is a timing diagram illustrating a first example scenario of bounding shape estimation. This example illustrates changes in a first person 622, a camera 618, and a processor 604 over a period of time 642.

In this scenario, a first person 622 walks behind a second person, as viewed by a camera 618. At 601, the first person 622 is visible in the field of view of a camera 618. For example, the first person 622 may move within the field of view of the camera 618. At 603, the camera 618 may capture a first set of images from time $T_1$ to $T_2$. At 605, the processor 604 may provide the first set of images to a ML model to generate a bounding shape to represent the first person 622.

At 607, the first person 622 moves behind a second person (e.g., main user of an electronic device). From $T_3$ to $T_4$, the camera 618 captures, at 609, a second set of images. However, when the first person 622 walks behind the second person, the ML model may lose track of the first person 622 and stops generating the bounding shape.

At 611, the processor 604 may estimate the bounding shape for the first person 622. For example, the processor 604 may use information from the bounding shape generated in the first set of images to determine that the first person 622 is close by the second person when the information stopped.

The processor 604 may use a filter (e.g., a Kalman filter) to estimate the location of a bounding shape. The processor 604 may also estimate the size (e.g., average minimum, or maximum of the bounding shape from the first set of images). In another approach, the processor 604 may use a filter (e.g., a Kalman filter) to predict each individual corner of the bounding shape for the first person 622, given a minimum of n images of observation. Using the results of the filter for each corner, the processor 604 may predict the size and location of the bounding shape for the first person 622 in the first set of images.

At 613, the first person 622 moves past the second person and becomes visible again. From $T_5$ onward, the camera 618 captures, at 615, a third set of images. The ML model may resume detection of the first person 622 and may generate the bounding shape for the first person 622, at 617.

Figure 7:
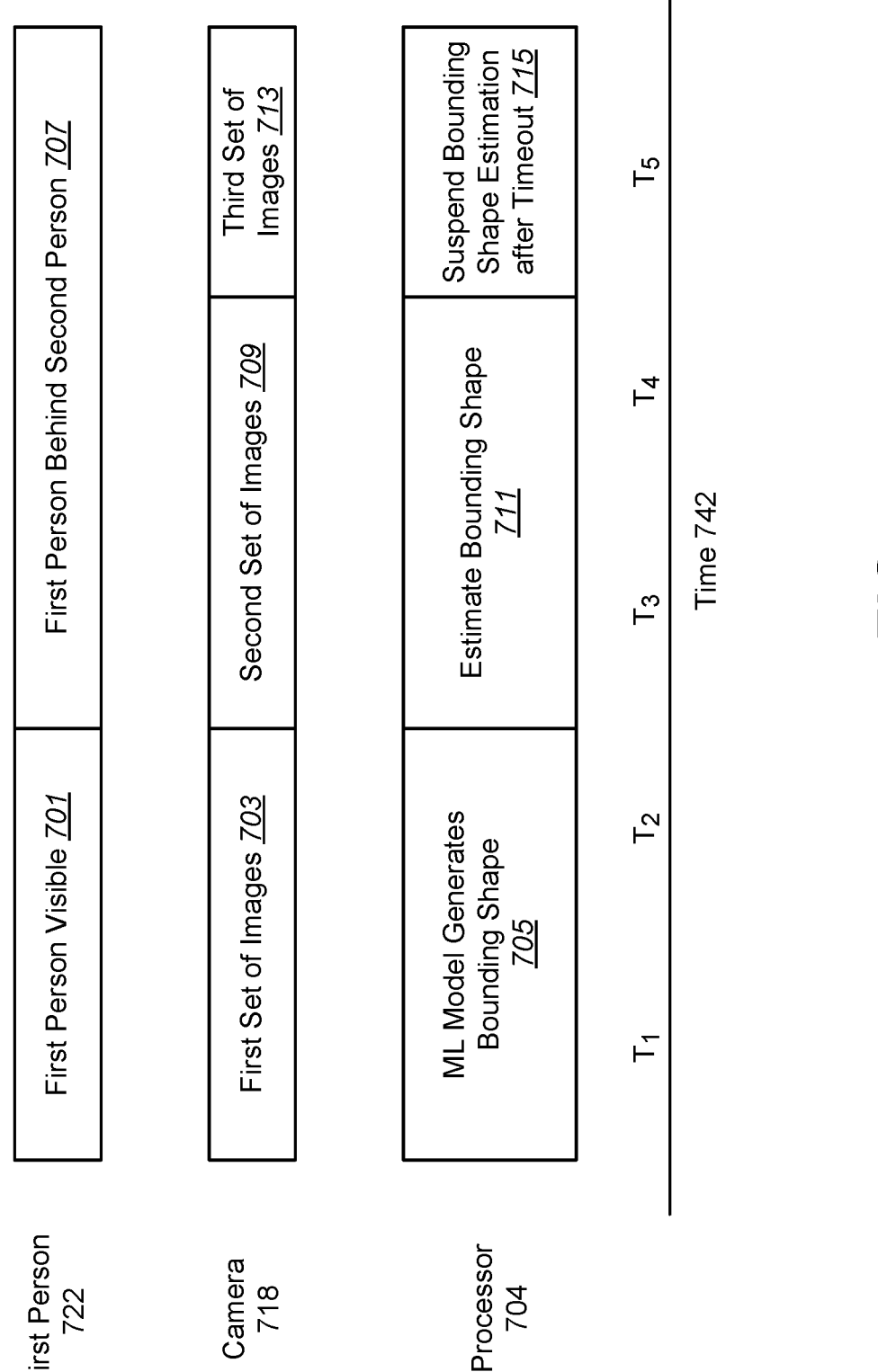
FIG. 7 is a timing diagram illustrating a second example scenario of bounding shape estimation.

FIG. 7 is a timing diagram illustrating a second example scenario of bounding shape estimation. This example illustrates changes in a first person 722, a camera 718, and a processor 704 over a period of time 742. In this scenario, a first person 722 moves behind a second person and stops, as viewed by the camera 718.

At 701, the first person 722 is visible in the field of view of a camera 718. For example, the first person 722 may move within the field of view of the camera 718. At 703, the camera 718 may capture a first set of images from time $T_1$ to $T_2$. At 705, the processor 704 may provide the first set of images to a ML model to generate a bounding shape to represent the first person 722.

At 707, the first person 722 moves behind a second person (e.g., main user of an electronic device). However, in this scenario, the first person 722 stops moving once they are behind the second person. From $T_3$ to $T_4$, the camera 718 captures, at 709, a second set of images. Because the first person 722 is located behind the second person, the ML model loses track of the first person 722 and stops generating the bounding shape.

At 711, the processor 704 estimates the bounding shape for the first person 722. This may be accomplished as described in FIG. 6.

From $T_5$ onward, the camera 718 captures, at 713, a third set of images. However, the first person 722 is still obscured behind the second person. Because the first person 722 is not tracked by the ML model after a timeout period, the processor 704 may suspend bounding shape estimation, at 715.

FIG. 8 is a timing diagram illustrating a third example scenario of bounding shape estimation. This example illustrates changes in a first person 822, a camera 818, and a processor 804 over a period of time 842. In this scenario, a person 822 walks into the field of view of a camera 818 and later turns away from the camera 818.

At 801, the person 822 faces the camera 818 in the field of view of the camera 818. For example, the person 822 may move within the field of view of the camera 818. At 803, the camera 818 may capture a first set of images from time $T_1$ to $T_2$. At 805, the processor 804 may provide the first set of images to a ML model to generate a bounding shape to represent the person 822.

At 807, the person turns away from the camera 818. From $T_3$ to $T_4$, the camera 818 captures, at 809, a second set of images. However, when the person 822 turns away from the camera 818, the ML model may lose track of the person 822 and may stop generating the bounding shape. For example, the ML model may not have enough information to detect the person 822 when their face and/or other body features are not visible.

At 811, the processor 804 may estimate the bounding shape for the person 822. This may be accomplished as described in FIG. 6.

At 813, the person 822 turns to face the camera 818 again. From $T_5$ onward, the camera 818 captures, at 815, a third set of images. The ML model may resume detection of the person 822 and may generate the bounding shape for the person 822, at 817. It should be noted that if the person 822 did not turn back to the camera 818 before an estimation timeout, the processor 804 may suspend bounding shape estimation.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. An electronic device, comprising:
   a processor to:
   provide a first set of images to an object tracker to output a bounding shape that represents a first object in the first set of images;
   determine a relative motion of the first object with respect to a second object in the first set of images;
   determine that the first object is obscured by the second object based on the relative motion of the first object;
   lose track, via the object tracker, of the first object in a second set of images in response to the first object being obscured by the second object; and
   estimate a size and location of the bounding shape in the second set of images in response to the object tracker losing track of the object in the second set of images, wherein the location of the bounding shape is estimated using a minimum x-coordinate and a minimum y-coordinate, a maximum x-coordinate and a maximum y-coordinate, or an average location of the bounding shape in the first set of images.

2. The electronic device of claim 1, wherein the bounding shape output by the object tracker comprises size information and location information for the bounding shape.

3. The electronic device of claim 1, wherein the processor to estimate the location of the bounding shape comprises the processor to:
   determine that the object is static in the first set of images; and
   use location information for the bounding shape output by the object tracker in the first set of images to determine the location of the bounding shape in the second set of images.

4. The electronic device of claim 1, wherein the processor to estimate the location of the bounding shape comprises the processor to:
   determine that the object is moving in the first set of images; and
   apply a filter to predict the location of the bounding shape in the second set of images based on location information for the bounding shape output by the object tracker in the first set of images.

5. The electronic device of claim 1, wherein the processor to apply a filter to predict the size and location of the bounding shape in the second set of images based on size information and location information for the bounding shape output by the object tracker in the first set of images.

6. The electronic device of claim 1, wherein the processor is to suspend bounding shape estimation in response to the object tracker tracking the object in a third set of images.

7. The electronic device of claim 1, wherein the processor is to suspend bounding shape estimation in response to expiration of a timeout period.

8. An electronic device, comprising:

a processor to:

generate, via an object tracker, a first bounding shape that represents a first person and a second bounding shape that represents a second person in a first set of images;

determine a relative motion of the first object with respect to a second object in the first set of images;

determine a proximity of the first bounding shape with respect to the second bounding shape;

determine that the first person is obscured by the second person based on the relative motion of the first person and the proximity;

lose track, via the object tracker, of the first person in a second set of images in response to the first person being obscured by the second person;

estimate, via a bounding shape estimator, a size and location of the first bounding shape in the second set of images in response to losing track of the first person in the second set of images; and suspend estimation by the bounding shape estimator in response to the first person moving into view from behind the second person.

9. The electronic device of claim 8, wherein the processor is to estimate the size and location of the first bounding shape in response to determining that the first person is obscured by the second person.

10. The electronic device of claim 8, wherein the processor is to suspend bounding shape estimation in response to the processor determining that an estimated location of the first person is outside of a location of the second person.

11. A non-transitory tangible computer-readable medium comprising instructions when executed cause a processor of an electronic device to:

provide a first set of images to a machine-learning (ML) model of an object tracker to output a bounding shape that represents a first person in the first set of images and a second bounding shape that represents a second person in the first set of images;

determine a proximity of the first bounding shape with respect to the second bounding shape and a relative motion of the first person with respect to the second person;

determine that the first person is obscured by the second person based on the proximity of the first bounding shape and the relative motion of the first person;

determine that the ML model of the object tracker loses track of the first person in a second set of images;

determine that the first person was in motion in the first set of images;

activate a filter of a bounding shape estimator to estimate a size and a location of the bounding shape in the second set of images in response to determining that the first person was in motion in the first set of images; and suspend the filter of the bounding shape estimator in response to the first person moving into view from behind the second person.

12. The non-transitory tangible computer-readable medium of claim 11, wherein the instructions when executed cause the processor to:

determine that the first person is within a threshold distance from a second person when the ML model lost track of the first person; and activate the filter to estimate the size and location of the bounding shape in response to determining that the first person is within the threshold distance from the second person.

13. The non-transitory tangible computer-readable medium of claim 11, wherein the filter comprises a Kalman filter.

14. The non-transitory tangible computer-readable medium of claim 11, wherein the instructions when executed cause the processor to suspend the bounding shape estimation in response to the ML model resuming tracking of the first person.

15. The electronic device of claim 1, wherein the processor further:

upon the size and location of the bounding shape being estimated, start a timeout period; and suspend the estimation of the size and location of the bounding shape in the second set of images in response to an expiration of a timeout period.

\* \* \* \* \*